(12) United States Patent
Inari

(10) Patent No.: US 7,025,225 B2
(45) Date of Patent: Apr. 11, 2006

(54) LID OPENING-CLOSING MECHANISM AND STORAGE DEVICE FOR VEHICLE

(75) Inventor: Takahiko Inari, Toyota (JP)

(73) Assignee: Nifco Inc., Yokohama (JP)

( * ) Notice: Subject to any disclaimer, the term of this patent is extended or adjusted under 35 U.S.C. 154(b) by 115 days.

(21) Appl. No.: 10/440,125

(22) Filed: May 19, 2003

(65) Prior Publication Data

US 2004/0020935 A1   Feb. 5, 2004

(30) Foreign Application Priority Data

Jul. 31, 2002   (JP) .............................. 2002-223141

(51) Int. Cl.
*B65D 43/16* (2006.01)

(52) U.S. Cl. ...................... 220/830; 220/264; 220/835; 16/285; 296/37.12

(58) Field of Classification Search ................ 220/264, 220/830, 833, 835; 16/280, 285, 287; 296/37.12, 296/37.8; 132/293
See application file for complete search history.

(56) References Cited

U.S. PATENT DOCUMENTS

| 1,032,326 | A | * | 7/1912 | Erichsen ...................... 220/830 |
| 1,629,747 | A | * | 5/1927 | Stathes et al. ............ 220/203.1 |
| 2,867,842 | A | * | 1/1959 | Morton ......................... 16/256 |
| 4,239,277 | A | * | 12/1980 | Oda ......................... 296/37.12 |
| 4,487,330 | A | * | 12/1984 | Grover et al. .............. 220/324 |
| 4,552,399 | A | * | 11/1985 | Atarashi ................... 296/37.12 |
| 4,679,700 | A | * | 7/1987 | Tharrington et al. ........ 220/825 |
| 5,520,313 | A | * | 5/1996 | Toshihide .................... 224/539 |

* cited by examiner

*Primary Examiner*—Nathan J. Newhouse
*Assistant Examiner*—James Smalley
(74) *Attorney, Agent, or Firm*—Manabu Kanesaka

(57) ABSTRACT

A lid opening-closing mechanism includes a main body having an opening, a lid attached to the main body for opening-closing the opening, a locking device for locking the lid at a closed position, and an urging device for urging the lid toward an open position. When the lid is released from the locking device, the urging device urges the lid to rotate toward the open position for opening the opening of the main body. The urging device includes the first spring member for urging the lid from a halfway position between the open position and the closed position, and the second spring member for urging the lid from the closed position to the halfway position.

11 Claims, 10 Drawing Sheets

LID OPENING-CLOSING MECHANISM AND STORAGE DEVICE FOR VEHICLE

BACKGROUND OF THE INVENTION AND RELATED ART STATEMENT

The present invention relates to a lid opening-closing mechanism for moving a lid between an open position and a closed position, and also relates to a storage device provided with the lid opening-closing mechanism.

FIGS. 9(a)–9(b) and 10(a)–10(b) show conventional storage devices. As shown in FIGS. 9(a) and 9(b), in the storage device disclosed in Japanese Patent Publication (Tokkai) No. 2001-336335, a lid 42 rotates relative to an upper opening of a box-like main member 41 to switch between a closed position shown in FIG. 9(a) and an open position shown in FIG. 9(b). A lid opening-closing mechanism includes four pins, i.e. two pairs of pins 44a and 44b, projecting on both sides of the lid 42; guide grooves 46 provided on both sides of the main member for receiving the pin 44a and 44b; torsion springs 43 for urging the lid 42 in two directions; and rotation plates 45 supported on axes 48 projecting on both sides of the main member and having clearance grooves 45a engaging ends of the pins 44a. The guide groove 46 has a branch groove 46a at an end thereof corresponding to a state where the lid 42 is at the closed position shown in FIG. 9(a). One end of the torsion spring 43 is fixed to an engagement part 47 on the main member 41, and the other end is fixed to the pin 44a.

The above-mentioned lid opening-closing mechanism works as follows. When the lid 42 is at the closed position shown in FIG. 9(a), the pins 44b are located at upper ends of the guide grooves 46, and the pins 44a are located in the branch grooves 46a. Also, the torsion springs 43 urge the lid 42 toward the closed direction. When switched to the open position, the lid 42 rotates around the pins 44b by a predetermined angle toward the open position against the urging forces of the torsion springs 43. After the pins 44a come to the guide grooves 46 from the branch grooves 46a, both pins 44a and 44b move to lower end sides of the guide grooves 46 as shown in FIG. 9(b). The torsion springs 43 urge the lid 42 to move toward the open position when the pins 44a enter the guide grooves 46 from the branch grooves 46a.

Similar to the device shown in FIGS. 9(a)–9(b), in the storage device shown in FIGS. 10(a)–10(b), a lid 52 rotates relative to an upper opening of a main member 51 to switch between a closed position shown in FIG. 10(a) and an open position indicated by an imaginary line in FIG. 10(b). The storage device shown in FIGS. 10(a)–10(b) has a lid opening-closing mechanism different from that shown in FIGS. 9(a)–9(b). The lid opening-closing mechanism includes pins 54a, 54b provided on both sides of the lid 52; guide grooves 56 provided on both sides of the main member 55 for receiving the pins 54a, 54b; coil springs 53 for urging the lid 52 toward the open position; a locking device (not shown) for holding the lid 52 at the closed position; and damper devices 58 disposed on sides of the main member.

The guide groove 56 includes a branch groove 56a in the same way as described above. Each of the coil springs 53 has one end fixed to an engagement part 57 of the main member 51 and the other end fixed to the pin 54a to provide a pulling force between the engagement part 57 and the pin 54a. The damper device 58 is a rotary type with a rotational axis 58a. The rotational axis 58a is connected to one end of the arm 59 to rotate together. The other end of the arm 59 is connected to the pin 54b.

The lid opening-closing mechanism works as follows. In the closed position shown in FIG. 10(a), the lid 52 engages the locking device against the urging force of the coil springs 53 urging the lid toward the open position. When the lid 52 is opened, the lid is released from the locking device to switch to the open position. As shown in FIG. 10(b), the pin 54a moves out of the branch groove 56a while pivoting around the pin 54b and moves along the guide grooves 56, so that the coil springs 53 urge the lid 52 to move toward the open position. Specifically, when the pin 54a moves in the branch groove 56a for a distance a shown in FIG. 10(a), the pin 54b does not move. The lid 52 rotates around the pin 54a, and moves at a damped speed along with the arm 59 of the damper device 58. When the pin 54a reaches all the way the end of the guide groove 56, the opening of the main member 51 is completely opened.

In the lid opening-closing mechanism in FIGS. 9(a), 9(b), the torsion springs 43 switch the moving direction of the lid 42 depending on the position thereof. When the lid 42 moves closer to the closed position during the opening-closing movement, the torsion springs 43 urge the lid 42 to move toward the closed position. When the lid 42 comes closer to the open position during the opening-closing movement, the torsion springs 43 urge the lid 42 to move toward the open position. When the lid 42 is at the closed position, the lid 42 is urged toward the closed direction by the torsion springs 43. Therefore, it is possible to eliminate the locking device for engaging the lid 42 at the closed position. However, the lid 42 does not move smoothly and tends to cause an undesired sound when the torsion springs 43 switch the moving direction of the lid. In addition, when the lid 42 is opened from the closed position shown in FIG. 9(a), it is necessary to push the lid 42 toward the open position against the urging forces of the torsion springs 43 to switch the urging direction of the torsion springs 43.

On the other hand, in the lid opening-closing mechanism in FIGS. 10(a), 10(b), when the locking device is released, the lid 52 moves from the closed position to the open position due to the urging forces of the coil springs 53. When the lid 52 is closed, the lid 52 moves from the open position to the closed position against the urging forces of the coil springs 53, in other words, the lid 52 is rotated while storing the urging forces for the coil springs 53 (spring charge). The coil springs 53 have the maximum spring forces at the closed position. Therefore, the locking device is required to have a large engagement force. Also, the lid 52 moves too fast in the early stage when the lid 52 is released and moves toward the open position, thereby causing a large variation in the rotational speed. Although the damper device 58 is provided for reducing the variation in the rotational speed, it requires additional labor to assemble to cause a higher cost and an increased weight.

As described above, the conventional lid opening-closing mechanisms have merits and demerits, and it is difficult to obtain a smooth switching operation.

The present invention has been made in view of these problems, and an object of the invention is to provide an opening-closing mechanism in which a lid automatically moves toward the open position when the lid at the closed position is released from a locking device. In the opening-closing mechanism of the invention, it is possible to reduce a variation in a rotational speed of the lid without using the conventional damper device, thereby improving functionality. It is also possible to reduce the maximum spring force of an urging device, thereby making it easy to simplify the locking device.

Further objects and advantages of the invention will be apparent from the following description of the invention.

SUMMARY OF INVENTION

In order to achieve the above objects, in a lid opening-closing mechanism according to the first aspect of the present invention, a lid engages a locking device at a closed position for closing an opening of a box-like main member. When the lid is released from the locking device, an urging device urges the lid to rotate toward an open position for opening the opening of the box-like main member. The urging device includes the first spring member for urging the lid toward the open position from a halfway position between the open position and the closed position, and the second spring member for urging the lid to move from the closed position to near the halfway position.

According to the second aspect of the present invention, the first pin and the second pin are provided on the lid, and a guide groove is provided on the box-like main member. The first and second pins are fitted in the guide groove to move along the guide groove, so that the lid engages the locking device at the closed position for closing the opening of the main member. When the locking device is released, the urging device urges the lid to rotate toward the open position for opening the opening of the main member. The urging device includes the first spring member for urging the lid toward the open position from a halfway position between the open position and the closed position, and the second spring member for urging the lid to move from the closed position to near the halfway position.

The first aspect is different from the second aspect in terms of whether the lid is moved through both pins and the guide groove. Both aspects provide the same mechanism of opening and closing the lid. That is, in the lid opening-closing mechanism of both aspects, when the lid at the closed position is released from the locking device, the second spring member moves the lid up to the halfway position, and then the first spring member moves the lid to the open position. When the lid is closed, the lid moves up to near the halfway position against the urging force of the first spring member (while charging the first spring member), and then, the lid moves up to the closed position against the urging force of the second spring member (while charging the second spring member).

In this operation, the urging force or charging force required for the lid to rotate from the closed position to the open position is divided into the urging force (charging force) of the first spring member 40 and the urging force (charging force) of the second spring member 41. Therefore, as compared to the conventional mechanism with a single spring member, it is possible to eliminate a rapid movement of the lid toward the open position at an early stage of the rotation, and to reduce a variation in a rotational speed from the closed position to the open position.

The locking device may be formed of an engaging projection provided on the lid and an engagement part provided on the main member. With such a configuration, when the lid moves to the closed position, the rotational resistance changes such that the lid initially rotates against the urging force of the first spring member and then against the urging force of the second spring member from the halfway position. Accordingly, the rotation resistance has a transition point, so that, for example, a user can adjust an operation force not for the engaging projection to hit the engagement part.

According to the second aspect, the lid switches the rotational movement while both pins move along the guide groove having a branch groove extending from an arc groove, in the same way as the conventional embodiments in FIGS. 9(a)–9(b) and 10(a)–10(b). In this case, when the lid is pushed further from the closed position, the second pin enters in the guide groove from the branch groove. At this time, the first pin receives a load in relation to a relative position, and the load is released when the second pin completely enters the guide groove. The second spring member urges the lid to move up to the halfway position from the closed position, and then the first spring member continuously urges the lid to move toward the open position.

According to the third aspect of the invention, links connected to arms provided on the lid are supported on side faces of the main member. An end of the first spring member engages an engagement hole provided in the link. An end of the second spring member abuts against a corresponding part of the arm. The link has a base supported on the side face to be rotatable and a free end rotatably connected to the corresponding part of the arm. Accordingly, the lid can move stably along the guide groove. Also, it is easy to connect an operation of the urging device to the arm directly or through the links.

According to the fourth aspect of the invention, the first spring member and the second spring member are integrated to form a coil spring portion having the ends. Thus, it is possible to reduce a manufacturing cost and improve part management.

According to the fifth aspect of the invention, the lid rotates roughly 90 degrees. That is, the lid rotates to switch between the open position where the lid is in a roughly horizontal position, and the closed position where the lid is in a vertical position. It is also possible that the lid rotates to switch between the open position where the lid is in a roughly vertical position, and the closed position where the lid is in a horizontal position, as shown in the conventional embodiment.

DETAILED DESCRIPTION OF PREFERRED EMBODIMENTS

Figure 1A:
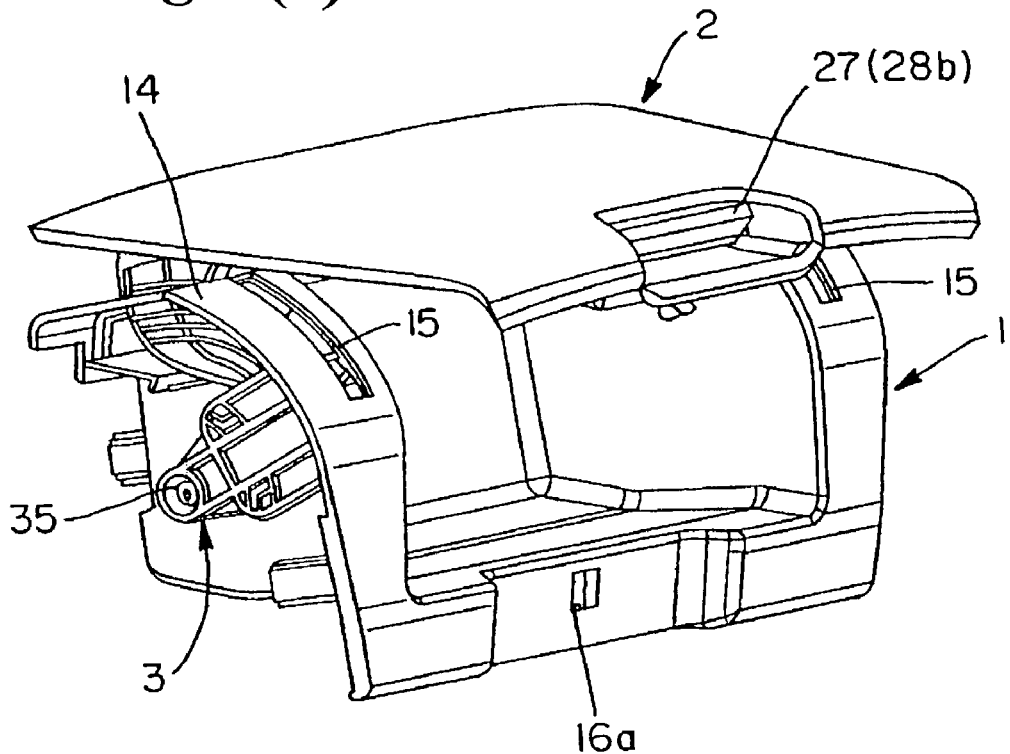
FIGS. 1(a) and 1(b) are schematic views showing a storage device of an embodiment of the invention.
Figure 1B:
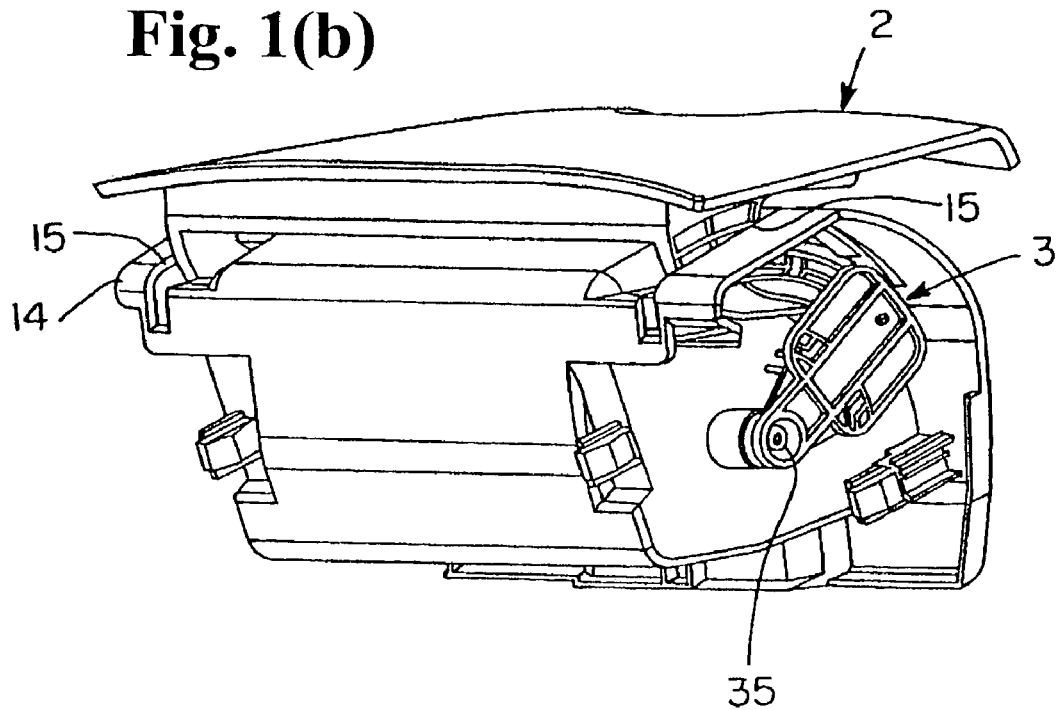
Figure 2:
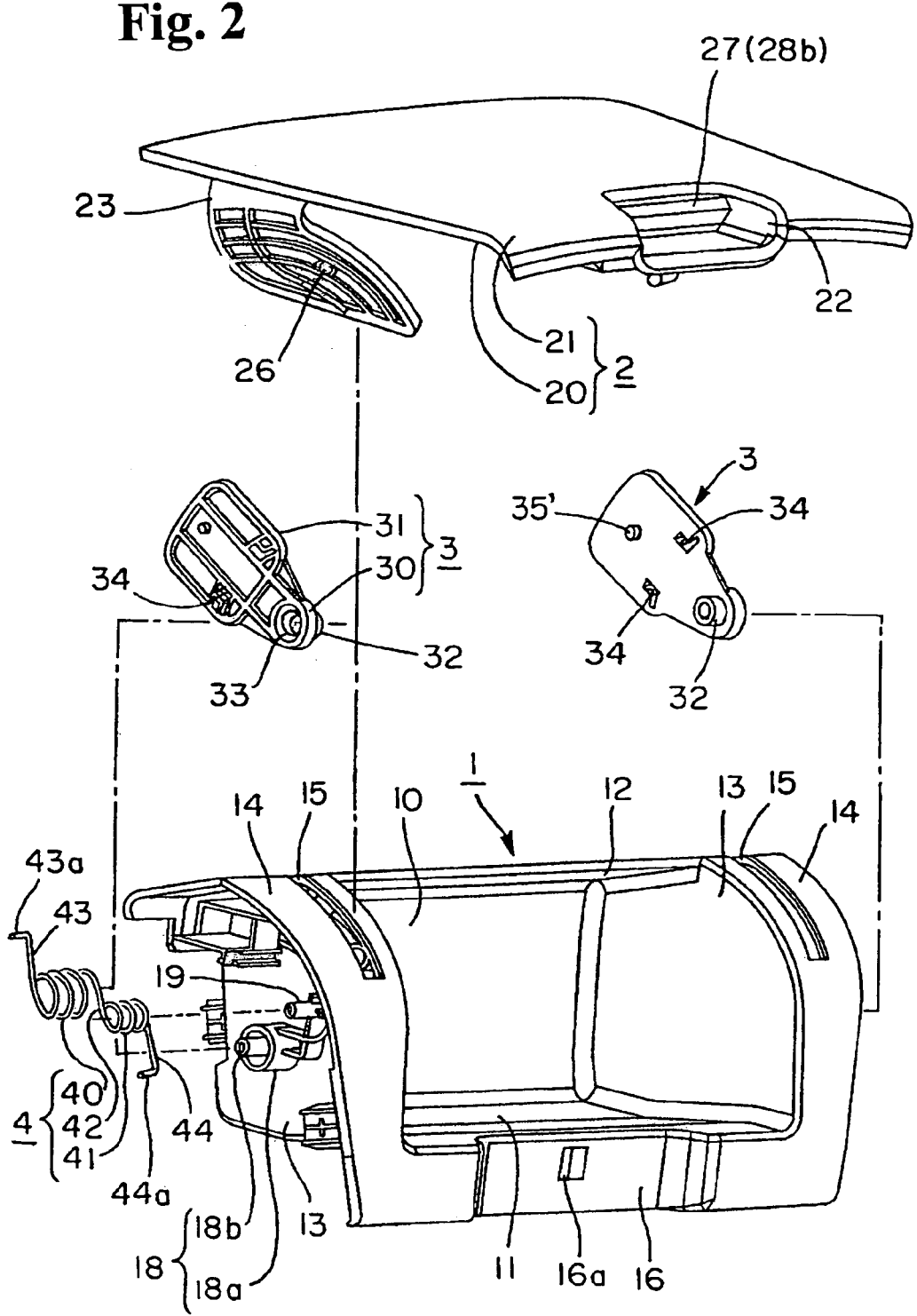
FIG. 2 is an exploded perspective view showing main members of the storage device.
Figure 3A:
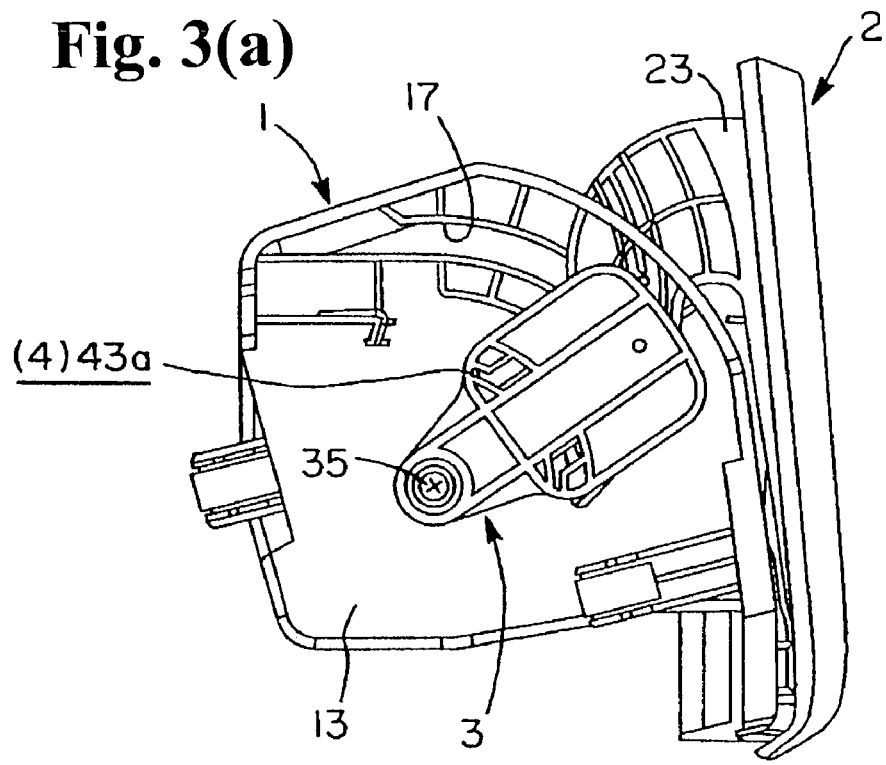
FIGS. 3(a) and 3(b) are side views showing the storage device in a lid open position and a lid closed position.
Figure 3B:
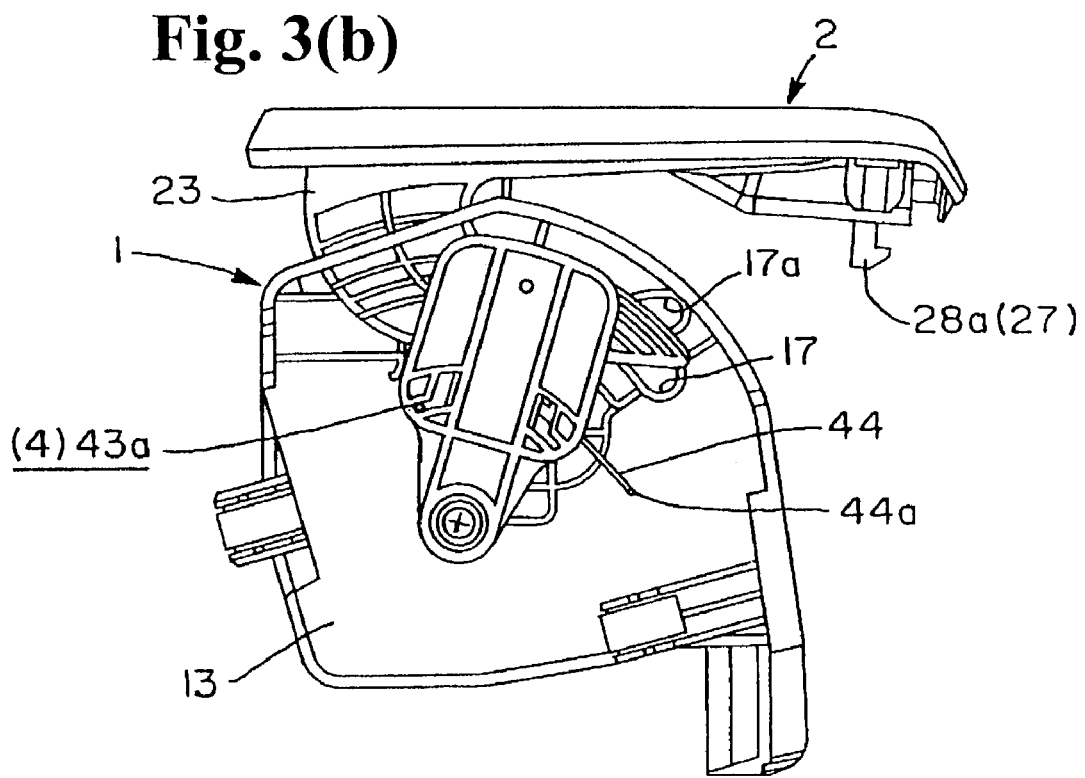
Figure 4A:
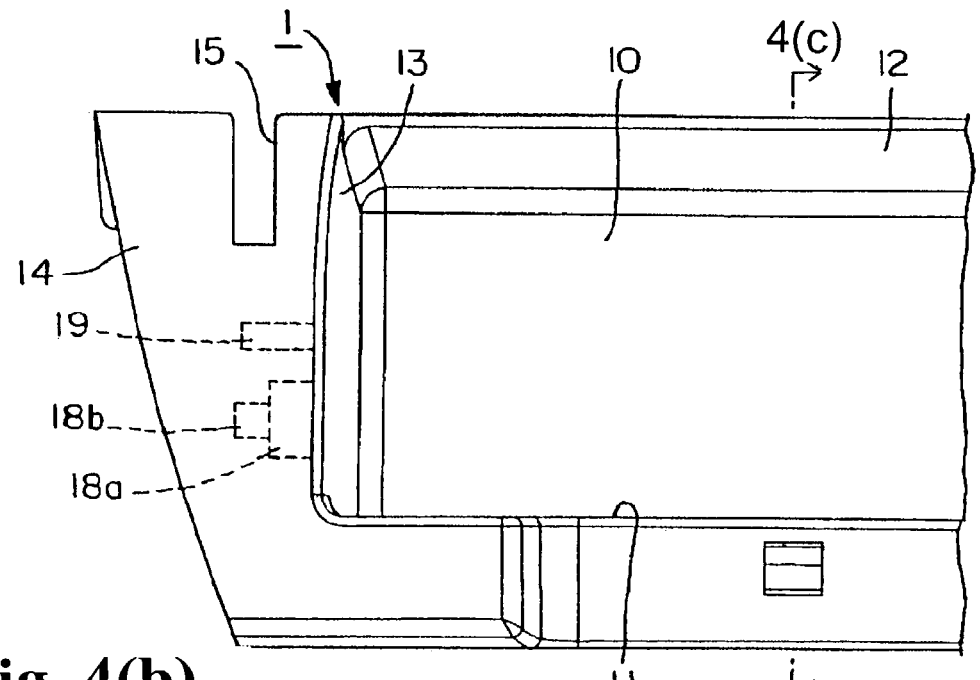
FIGS. 4(a)–4(d) are views showing the main members and an urging device of the storage device.
Figure 4B:
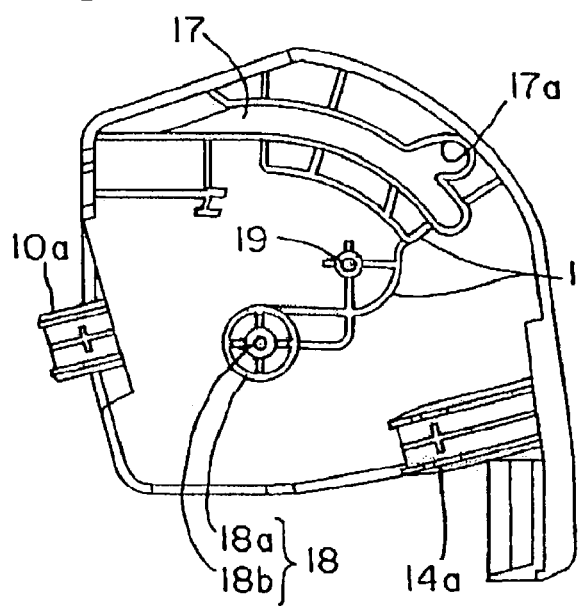
Figure 4C:
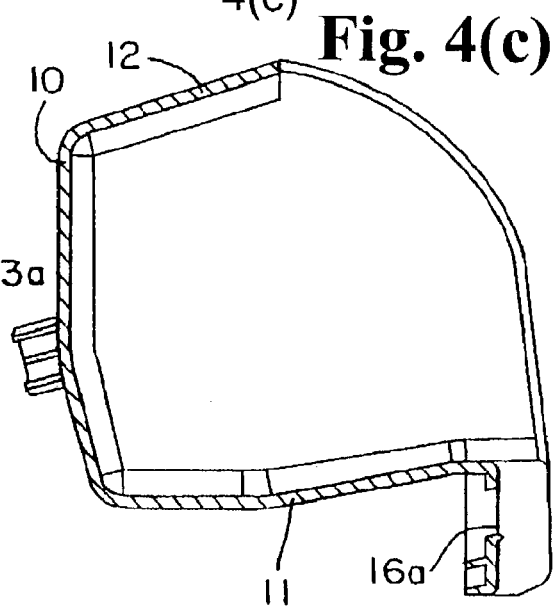
Figure 4D:
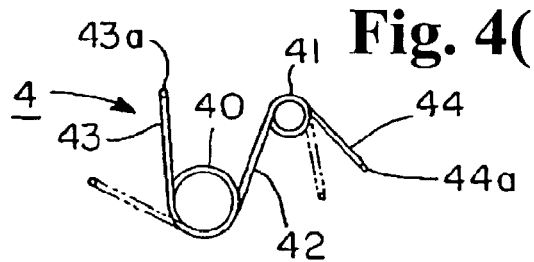
Figure 5A:
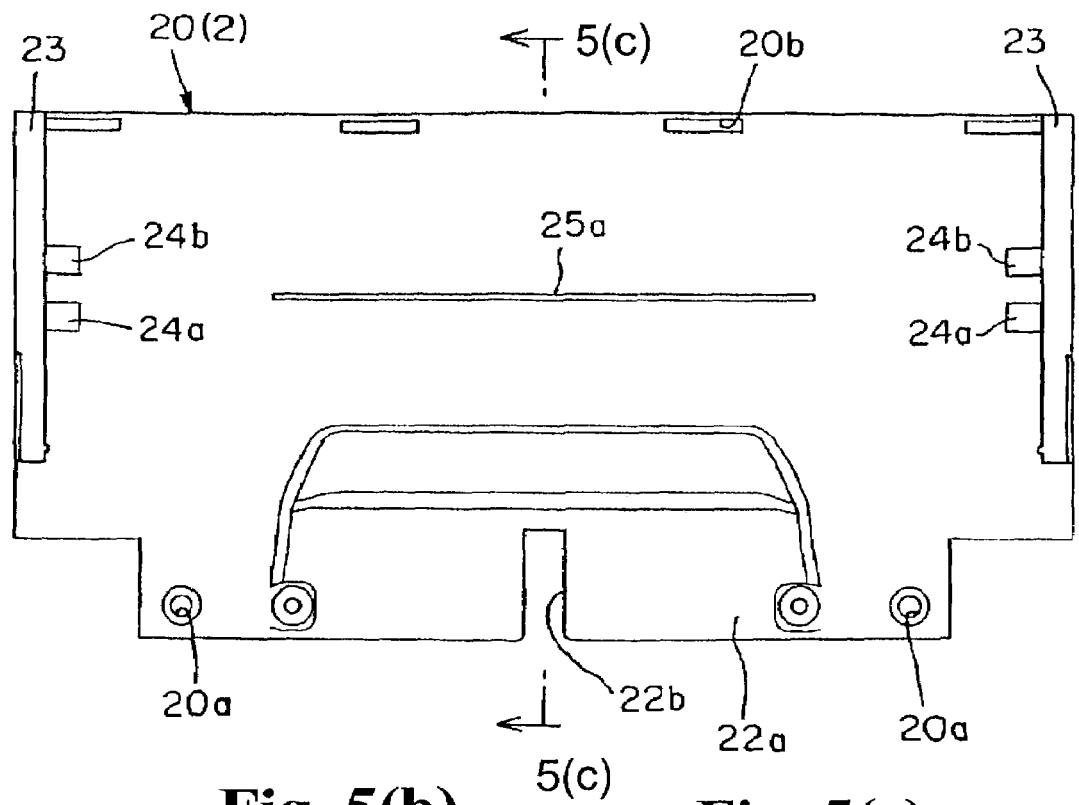
FIGS. 5(a)–5(c) are views showing a lid of the storage device.
Figure 5B:
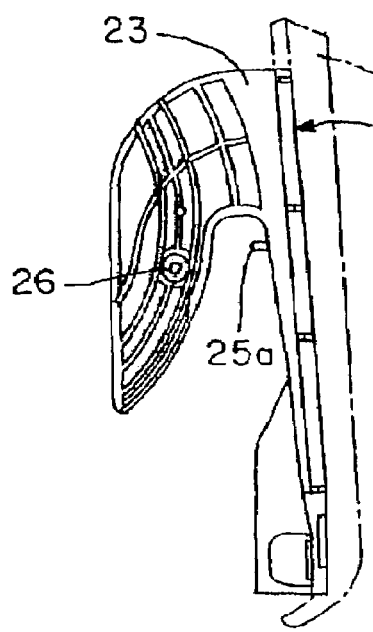
Figure 5C:
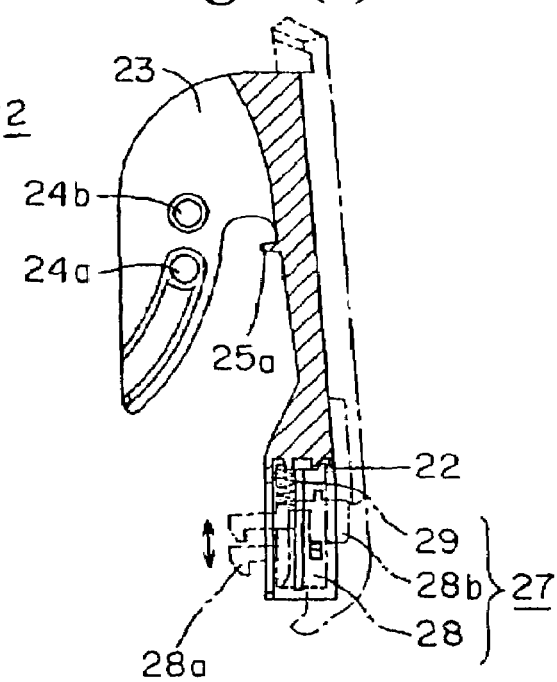
Figure 6A:
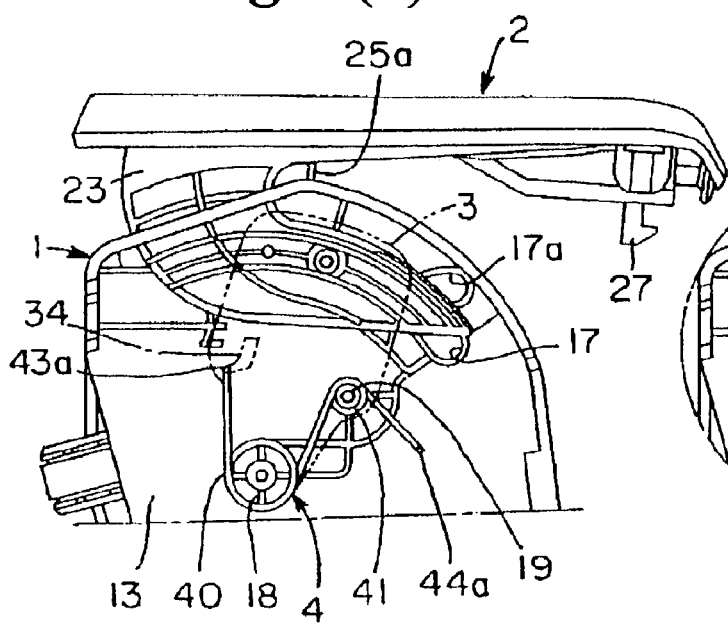
FIGS. 6(a) and 6(b) are views showing an operation of a lid opening-closing mechanism of the storage device.
Figure 6B:
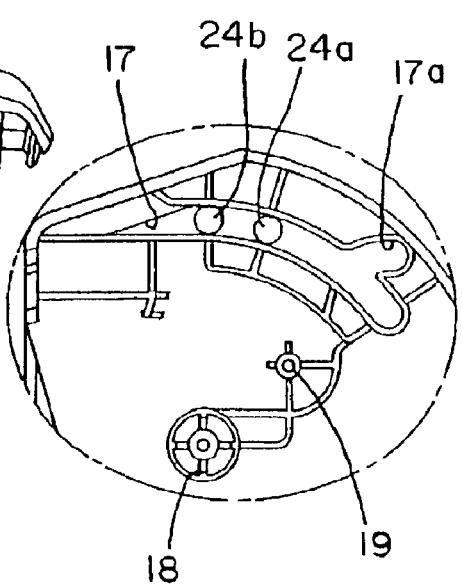
Figure 7A:
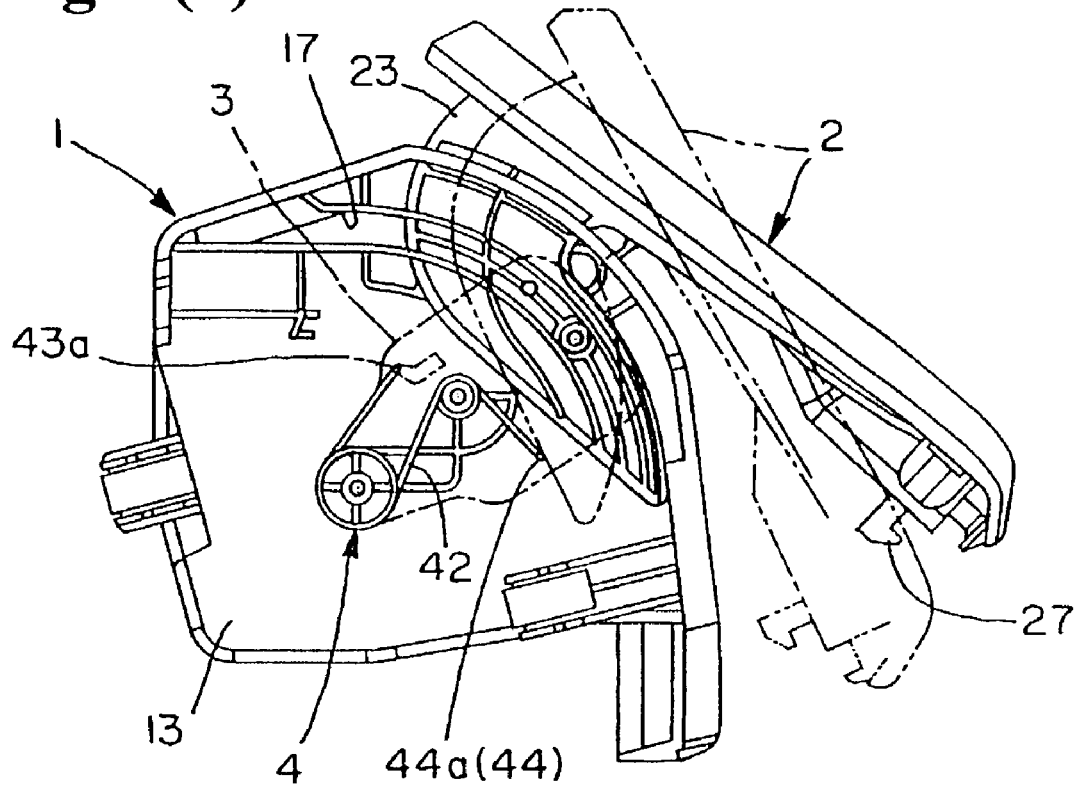
FIGS. 7(a) and 7(b) are views showing the operation of the lid opening-closing mechanism of the storage device.
Figure 7B:
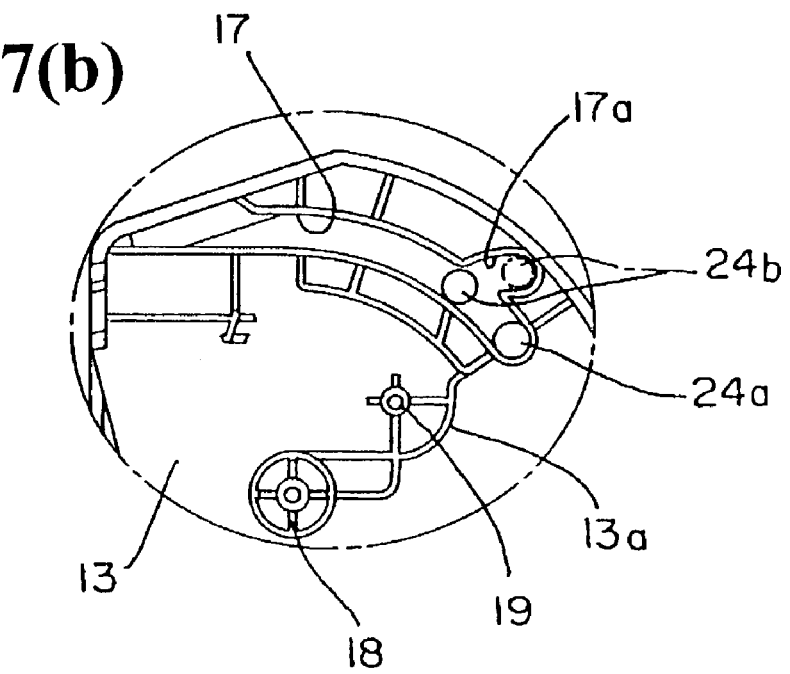

Hereunder, embodiments of the present invention will be explained with reference to the accompanying drawings. FIGS. 1(a)–8(b) show a storage device according to the present invention. FIGS. 1(a)–1(b) are schematic views of the storage device, wherein FIG. 1(a) is a front view thereof, and FIG. 1(b) is a rear view thereof. FIG. 2 is an exploded perspective view showing structural members of the storage device. FIGS. 3(a)–3(b) are side views of the storage device, wherein FIG. 3(a) shows a lid at a closed position, and FIG. 3(b) shows the lid at an open position. FIGS. 4(a)–4(d) show details of a box-like main member and an urging device, wherein FIG. 4(a) is a front view of the main member, FIG. 4(b) is a side view of the main member, FIG. 4(c) is a cross sectional view taken along line 4(c)–4(c) in FIG. 4(a), and FIG. 4(d) is a side view of the urging device. FIGS. 5(a)–5(c) show details of the lid (a core material side), wherein FIG. 5(a) is a rear view, FIG. 5(b) is a side view, and FIG. 5(c) is a cross sectional view taken along line 5(c)–5(c) in FIG. 5(a). FIGS. 6(a)–6(b) and 7(a)–7(b) are views showing an operation of the lid opening-closing mechanism, wherein FIGS. 6(a) and 7(a) are side views without a link, and FIGS. 6(b) and 7(b) are views showing a relation between a guide groove and pins. Hereinafter, an overall outline, structural members, an assembly, and the operation will be described in this order.

Figure 9A:
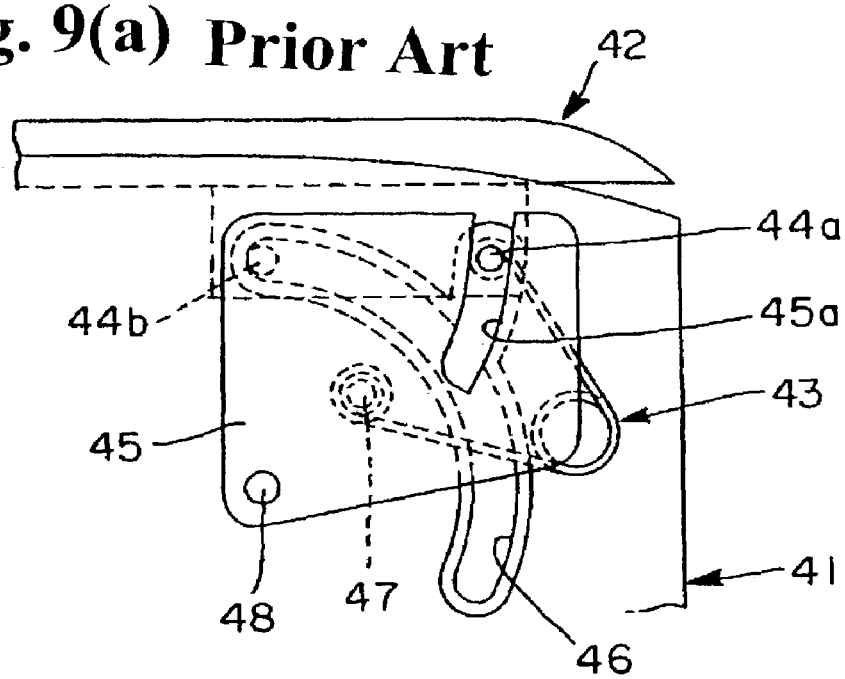
FIGS. 9(a) and 9(b) are views showing a conventional storage device and a lid opening-closing mechanism.
Figure 9B:
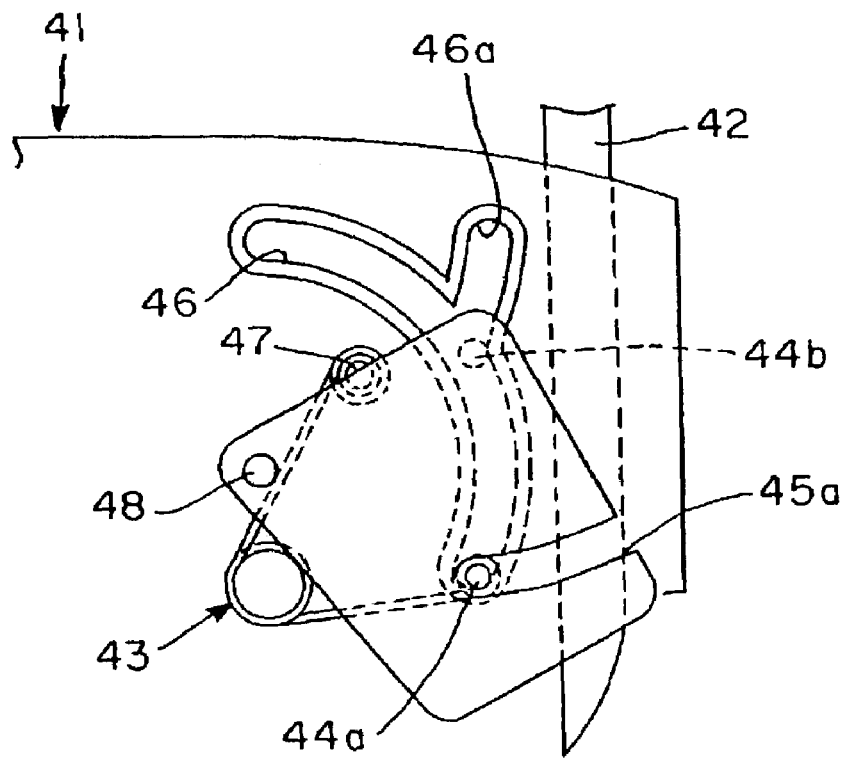
Figure 10A:
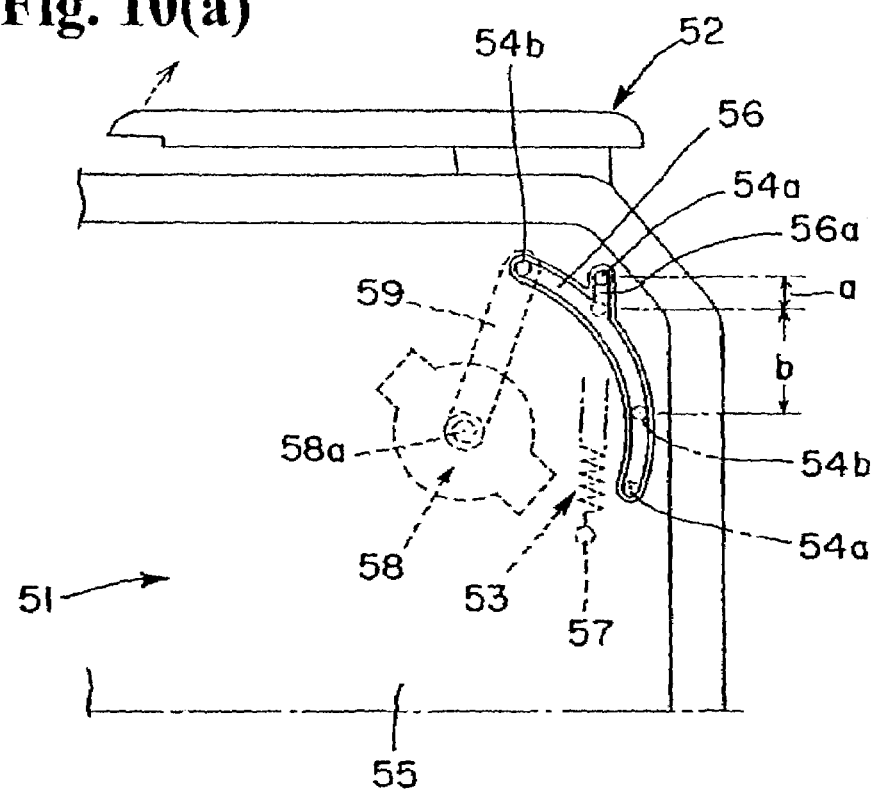
FIGS. 10(a) and 10(b) are views showing another conventional storage device and a lid opening-closing mechanism.
Figure 10B:
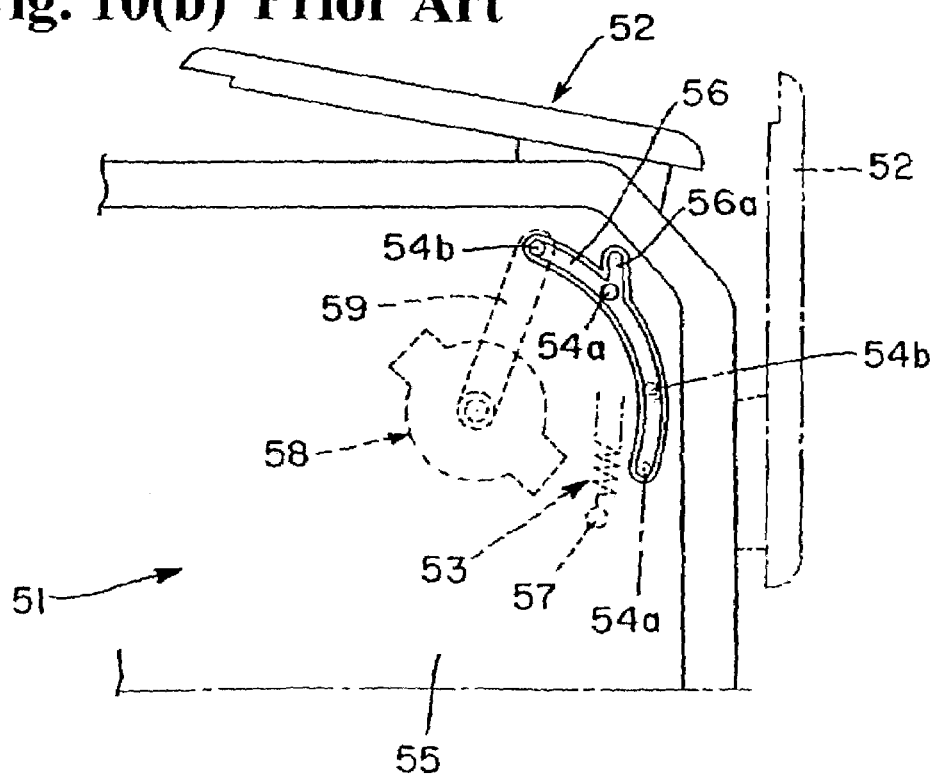

In the storage device of the embodiment, a box-like main member 1 has an opening at a front side thereof, and a lid 2 opens and closes the opening. The storage device is installed in an instrument panel inside a vehicle (a depressed part provided at a roughly intermediate position in a width direction of the vehicle). The device may be installed in a portion other than the instrument panel, or build in a part of a center console, etc. Also, the box-like main member 1 includes the opening corresponding to the lid 2 and portions for attaching components such as links 3 (described later), etc. It is possible to change internal parts and an external appearance of the main member according to an application. As long as the lid 2 opens and closes the opening of the main member 1, the opening can be formed on, for example, an upper side of the main member as shown in FIGS. 9(a) and 9(b).

According to the embodiment, the lid 2 rotates to switch between the open position where the lid is in a roughly horizontal position, and the closed position where the lid is in a vertical position. It is also possible that the lid rotates to switch between the open position where the lid is in a roughly vertical position, and the closed position where the lid is in a horizontal position as shown in FIGS. 9(a) and 9(b). That is, the lid 2 is arranged to rotate to switch between the closed position and open position relative to the opening of the main member 1. The lid opening-closing mechanism is provided for rotating the lid 2 to switch between the closed position and open position relative the opening of the main member 1. The mechanism includes arms 23 of the lid 2, links 3, spring units 4 as urging devices, and a locking device 27. The main member 1, lid 2, and links 3 are resin-molded components.

A relation between the main member 1 and spring units 4 is described next. The box-like main member 1 has an interior compartment defined by a rear face 10, bottom face 11, upper face 12 without a front side, and both side faces 13, as shown in FIGS. 2 and 4(a). The box-like main member 1 has a receptacle shape including the opening at the front side. A front side of the upper face 12 has a large opening according to an installing position where the storage device is installed, so that when it is seen from above, most of the bottom face 11 is visible. Both side faces 13 are provided with side flange portions 14 extending to a front lower side from upper edges thereof, guide grooves 17 passing through inside to outside thereof, and large axis portions 18 and small axis portions 19 projecting toward outside. The bottom face 11 is provided with a lower flange portion 16 connected to lower parts of the side flange portions 14 at both sides. Positioning projections 10a project from the rear face 10, and are used when the main member 1 is installed in a depressed part of the installing position. Clips (not shown) project from the side flange portions 14 for allowing the main member 1 to be attached to the depressed part.

The flange portions 14 at both sides have long holes 15 passing through vertically and extending from front to rear. The long holes 15 have a size so that the arms 23 of the lid 2 are inserted from above and rotate at outside of the side faces 13. The lower flange portion 16 has a depression at the middle thereof in a width direction. An engagement part 16a is provided in the depression and passes through from front to rear.

Each guide groove 17 is formed in an arc shape passing through from inside to outside and extending to the front side from the rear side of the main member 1, and includes a branch groove 17a extending from the arc groove. The guide groove (arc groove) 17 is a main groove and defines a rotational track of the lid 2. The branch groove 17a is disposed at a location closer to lower end of the guide groove 17 (arc groove), thereby allowing fine adjustment or displacement of the rotational track of the lid 2 moving in the guide grooves 17.

The large axis portion 18 is composed of an outer tube 18a and inner tube 18b projecting from inside of the outer tube 18a. The outer surface of the inner tube 18b becomes a pivot for the link, and an inside hole is used for tapping. The spring unit 4 is supported on the outer tube 18a and the small axis portion 19 at corresponding part of the unit. Ribs 13a are projected at edges and periphery parts of the guide groove 17 and between the large axis portion 18 and the small axis portion 19. The link 3 contacts the ribs 13a in line, thereby making it easy to rotate and move.

The spring unit 4 is attached to the large and small axis portions 18, 19. As shown in FIGS. 2 and 4(d), the spring unit 4 is formed of a wire rod including a coil spring 40 as the first spring member, a coil spring 41 as the second spring member, and a connecting portion 42 connecting the coil springs 40 and 41. The coil spring 40 has a diameter corresponding to the large axis portion 18, and an end of a linear portion 43 extending from the coiling spring is bent roughly in a right angle to form an operating edge 43a. The coil spring 41 has a diameter corresponding to the small axis 19, and an end of a linear portion 44 extending from the coiling spring is bent roughly in a right angle to form an operating edge 44a. In the spring unit 4, the coil spring 40 is supported and fitted to the outer surface of the large axis portion 18, and the coil spring 41 is supported and fitted to the outer surface of the small axis portion 19. Both operating edges 43a, 44a project in the same direction.

The lid 2 has a size enough for closing the opening of the main member 1 as shown in FIG. 2 and FIGS. 5(a)–5(c). The lid 2 is formed of a lid main member at a lower side thereof (hereinafter referred to as a core material) 20, a decorative cover 21 attached to the core material 20, and a locking device 27 attached to a front side of a middle portion 22 in the width direction. The core material 20 has attachment holes 20a and engagement holes 20b located at front and back sides thereof; a locking placement portion 22a and a clearance groove 22b corresponding to the middle portion 22; arms 23 projecting downward from both sides; and control ribs 25a disposed at the center and extending right and left. The cover 21 is fitted to the core material 20 through engagement with the engagement hole 20b and screws through the attachment hole 20a.

In the arm 23, the first pins 24a and second pins 24b project in opposed inner faces. The pins 24a, 24b have almost the same size, and are fitted in the guide groove 17 and the branch groove 17a to slide therein. Depressed parts 26 are disposed at outsides of the arms 23, and are connected to the links 3. As shown in FIG. 5(c), the locking device 27 is composed of a base 28 to be attached to the middle portion 22 (placement portion 22a) to be able to slide and fix, and a coil spring 29 for urging the base 28 downward in the figure.

An engaging projection 28a projects at a rear side of the base 28, and an operating part 28b projects at a front side of the base 28. An end of the engaging projection 28a is formed in a pawl with an inclined end, and the engaging projection 28a engages a hole of the engagement part 16a. The operating part 28b is an operating lever stored in the middle portion 22 as shown in FIG. 2.

The locking device 27 is usually in an engaged position through the base 28 where the coil spring 29 urges the engaging projection 28a to move (a state of engaging the hole of the engagement part 16a). When the operating part 28b is pushed, or the base 28 is moved against the urging force of the coil spring 29, this engagement is switched to a release position (a state of passing through the hole of the engagement part 16a).

Such a locking structure is formed of a simple structure, and a structure other than the above locking device can be applicable. An example includes a push and push engagement mechanism described in Japanese Patent Application No. 2001-12455. In that case, the push and push engagement mechanism is provided in the main member 1 in place of the engagement part 16a. The engagement projection projects at the placement portion 22a of the lid. When the lid 2 rotates or is pushed in the open direction, the engagement projection engages the push and push engagement mechanism to hold the lid 2 at the closed position. When the lid is pushed in the closed direction from the closed position, the engagement is released.

As shown in FIG. 2, two links 3 are used, each being situated between the arm 23 and the corresponding large axis portion 18. In this embodiment, the links 3 have the same shape so that they are exchangeable. That is, the link 3 has a roughly rectangular shape, and is provided with a base 30 corresponding to the large axis portion 18 at the end of the plate 31. The base 30 is provided with a tube 32 for receiving an inner tube 18b therein and a depressed part 33 for receiving screw head. The plate 31 is provided with a pair of engagement holes 34 at both sides and a projected part 35' for fitting in the depressed part 26.

When the storage device is assembled, the arms 23 of the lid 2 are inserted through the corresponding long holes 15 of the main member 1 to be disposed outside of both side faces 13. At that time, the pins 24a, 24b are inserted into the guide grooves 17 on the side faces 13 from outside. After the spring units 4 are assembled in the above-mentioned way, the arms 23 of the lid 2 and the large axis portions 18 are linked with the links 3.

The links 3 cover the spring units 4 from above and the projected parts 35 are fitted in the depressed parts 26. As the link 3 is fitted, the base 30 is disposed on the large axis portion 18 so that the inner tube 18b is inserted into the tube 32. At the same time, the operating edge 43a of the coil spring 40 composing the spring unit 4 is fixed to the corresponding engagement hole 34. As shown in FIGS. 1(a) and 1(b), the link 3 is attached with a setscrew 35 screwing into the inner tube 18b from the depressed part 33, thereby completing the storage device.

In the assembled state, the link 3 rotates freely around the inner tubes 18b, and the arm 23 (lid 2) is connected to the link 3 and rotates. In the spring unit 4, the coil spring 40 acts on the lid 2 through the operating edge 43a, the link 3 and the arm 23. A pulled-out angle of each of the linear portions 43, 44, and a positional relationship among the links 3, arms 23 and operating edges 43a, 44a are adjusted to optimize the urging force or spring charging force of the operating edges 43a, 44a. Thus, the coil springs 40 urge the lid 2 through the links 3 to move toward the open position from the halfway position between the open position and the closed position. The coil springs 41 urge the lid 2 through the arms 23 to move up to the halfway position from the closed position.

Next, an operation of the lid 2 of the storage device will be explained with reference to FIG. 6(a) to FIG. 8(b). FIGS. 6(a) and 6(b) show a state where the lid 2 is at the open position, or the front opening of the main member 1 is fully opened. In this state, the pin 24b is positioned at the upper end of the guide groove 17, and the pin 24a is positioned in the middle of the pin 24b and the branch groove 17a. The control rib 25a touches a front edge of the upper face 12 of the main member to control the position. The operating edge 43a has a minimal urging force, and the operating edge 44a is away from the arm 23. The lid 2 is held in a stable fashion, and it is possible to put an article in and out of the storage space of the main member 1 from the front opening.

When the lid 2 is closed, the front side of the lid 2 is pushed downward against the urging force of the operating edge 43a. The lid 2 rotates to a position indicated by a solid line shown in FIG. 7(a), accompanied by the guiding operation of the guide groove 17 and the pins 24a, 24b. In this rotation process, the link 3 is moved around the large axis portion 18 (the inner tube 18b), and the operating edge 43a restores the urging force or the spring charging force through the link 3. In the solid line position in FIG. 7(a), the pin 24a moves to the lower end of the guide groove 17, and the pin 24b moves close to entrance of the branch groove 17a.

When the lid 2 is pushed further, the lid 2 rotates around the pin 24a to a position indicated by a phantom line from the solid line position in FIG. 7(a). At this time, the arm 23 abuts against the operating edge 44a. While the lid 2 rotates from the phantom line position to the closed position against the urging force of the operating edge 44a, the pin 24b enters the branch groove 17a from the guide groove 17, and the operating edge 44a restores the urging force or the spring charging force through the arm 23. In the final stage, the locking device 27 engages the engagement part 16a, and the lid is held at the closed position shown in FIGS. 8(a) and 8(b).

As shown in FIGS. 5(a)–5(c) and 4(c), the engaging projection 28a abuts against the edge of the engagement part 16a hole. Due to the stress received from the edge of the hole, the engaging projection 28a is moved against the urging force of the coil spring 29, and passes through the engagement part 16a hole. Then, the engaging projection 28a is returned to its original engagement position due to the urging force of the coil spring 29.

Figure 8A:
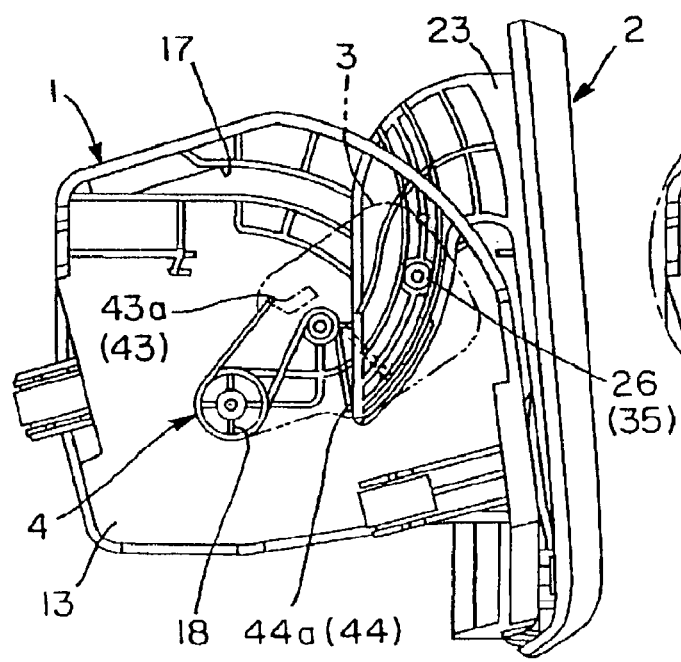
FIGS. 8(a) and 8(b) are views showing the operation of the lid opening-closing mechanism of the storage device.
Figure 8B:
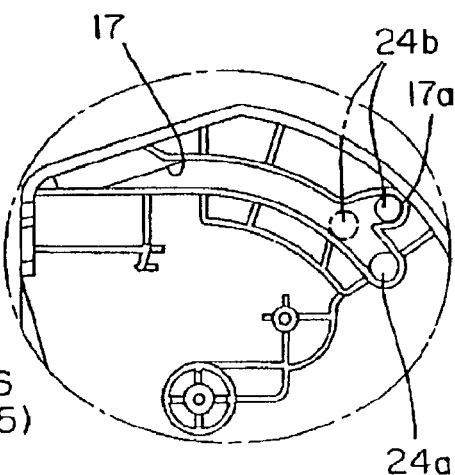

When the lid 2 is switched to the open position, the operating part 28b of the locking device 27 is pushed to the release position against the coil spring 29. The lid 2 is urged and moves to the state shown in FIGS. 7(a) and 7(b) with the urging force of the operating edge 44a through the arm 23 (in this process, as shown in FIG. 8(b), the pin 24b returns to the guide groove 17 from the branch groove 17a). Next, the lid 2 is continuously urged and moved to the open position shown in FIGS. 6(a) and 6(b) where the front opening of the main member 1 is exposed with the urging force of the operating edge 43a through the link 3 and the arm 23.

As described above, according to the lid opening-closing mechanism of the invention, as compared to the conventional configuration with the single spring material, it is possible to reduce the rapid rotation of the lid 2 in the early stage of rotation toward the open position after the lid 2 is released, and reduce the variation in the rotational speed from the closed position to the open position. Therefore, it is possible to eliminate the damper while maintaining the excellent operational characteristics. Further, when the lid 2 rotates toward the closed position, at first, the lid 2 rotates against the urging force (spring charging force) of the coil spring 40 (operating edge 43a) as the first spring member, then the lid 2 rotates against the urging force (spring charging force) of the coil spring 41 (operating edge 44a) as the second spring member from the middle position, thereby producing the transition point in the rotational resistance. As a result, the user can detect the transition of the rotational resistance, and it is possible to adjust the force to rotate the lid 2 so that the engaging projection 28a does not hit the engagement part 16a.

As explained above, in the lid opening-closing mechanism of the present invention, as compared to the conventional mechanism with the single spring material, it is possible to reduce the rapid rotation of the lid 2 in the early stage of rotation toward the open position after the lid 2 is released, and reduce the variation in the rotational speed from the closed position to the open position. Therefore, the operational characteristics are improved without using the conventional damper. In the storage device of the present invention, the excellent operation is achieved while reducing the cost and the weight.

While the invention has been explained with the reference to the specific embodiments of the invention, the explanation is illustrative and the invention is limited only by the appended claims.

What is claimed is:

1. A lid opening-closing mechanism comprising:
   a main body having an opening,
   a lid attached to the main body for opening-closing the opening,
   a locking device attached to the main body for locking the lid at a closed position, and
   an urging device attached to the lid for urging the lid toward an open position, said urging device having a first spring member for urging the lid toward the open position from a middle position between the open position and the closed position, and a second spring member for urging the lid from the closed position to the middle position separately from the first spring member, said first spring member and said second spring member being integrally formed together in one unit so that when the locking device at the closed position of the lid is unlocked, the lid is urged toward the open position by the first and second spring members.

2. A lid opening-closing mechanism according to claim 1, further comprising a guide groove formed on the main body, and guide means formed on the lid and disposed in the guide groove so that the guide means moves along the guide groove when the lid moves between the open position and the closed position.

3. A lid opening-closing mechanism according to claim 2, wherein said guide means has a first guide pin and a second guide pin spaced apart from each other.

4. A lid opening-closing mechanism according to claim 3, wherein said guide groove has a main groove where the first and second guide pins move, and a branch groove extending from the main groove where the second pin enters when the lid is fully opened.

5. A storage device for a vehicle comprising the lid opening-closing mechanism according to claim 1, said main body having the opening extending in a horizontal direction, said lid rotating about 90 degrees for opening and closing the opening.

6. A lid opening-closing mechanism according to claim 1, wherein said first spring member urges the lid only toward the open position from the middle position, and said second spring member urges the lid only from the closed position to the middle position.

7. A lid opening-closing mechanism according to claim 6, wherein said first spring member has a first end for urging the lid and a second end, and said second spring member has a third end connected to the second end and a fourth end for contacting the lid.

8. A lid opening-closing mechanism according to claim 7, wherein said first spring member further has a first coil attached to the main body, and said second spring member further has a second coil attached to the main body spaced from the first coil.

9. A lid opening-closing mechanism comprising:
   a main body having an opening,
   a lid attached to the main body for opening-closing the opening,
   a locking device attached to the main body for locking the lid at a closed position,
   an urging device attached to the lid for urging the lid toward an open position, said urging device having a first spring member for urging the lid toward the open position from a middle position between the open position and the closed position, and a second spring member for urging the lid from the closed position to the middle position so that when the locking device at the closed position of the lid is unlocked, the lid is urged toward the open position by the urging device,
   arms formed on two sides of the lid, and
   links, each link being operationally connected to the arm and rotationally attached to the main body, said link engaging an end of the first spring member and said arm being able to abut against an end of the second spring member.

10. A lid opening-closing mechanism according to claim 9, wherein said first spring member urges the lid only toward the open position from the middle position, and said second spring member urges the lid only from the closed position to the middle position.

11. A lid opening-closing mechanism according to claim 10, wherein said first spring member has a first end for urging the lid and a second end, and said second spring member has a third end connected to the second end and a fourth end for contacting the lid.

* * * * *